Aug. 7, 1962     F. C. MELCHIOR     3,048,037
TANK GAUGING DEVICE
Filed April 25, 1960
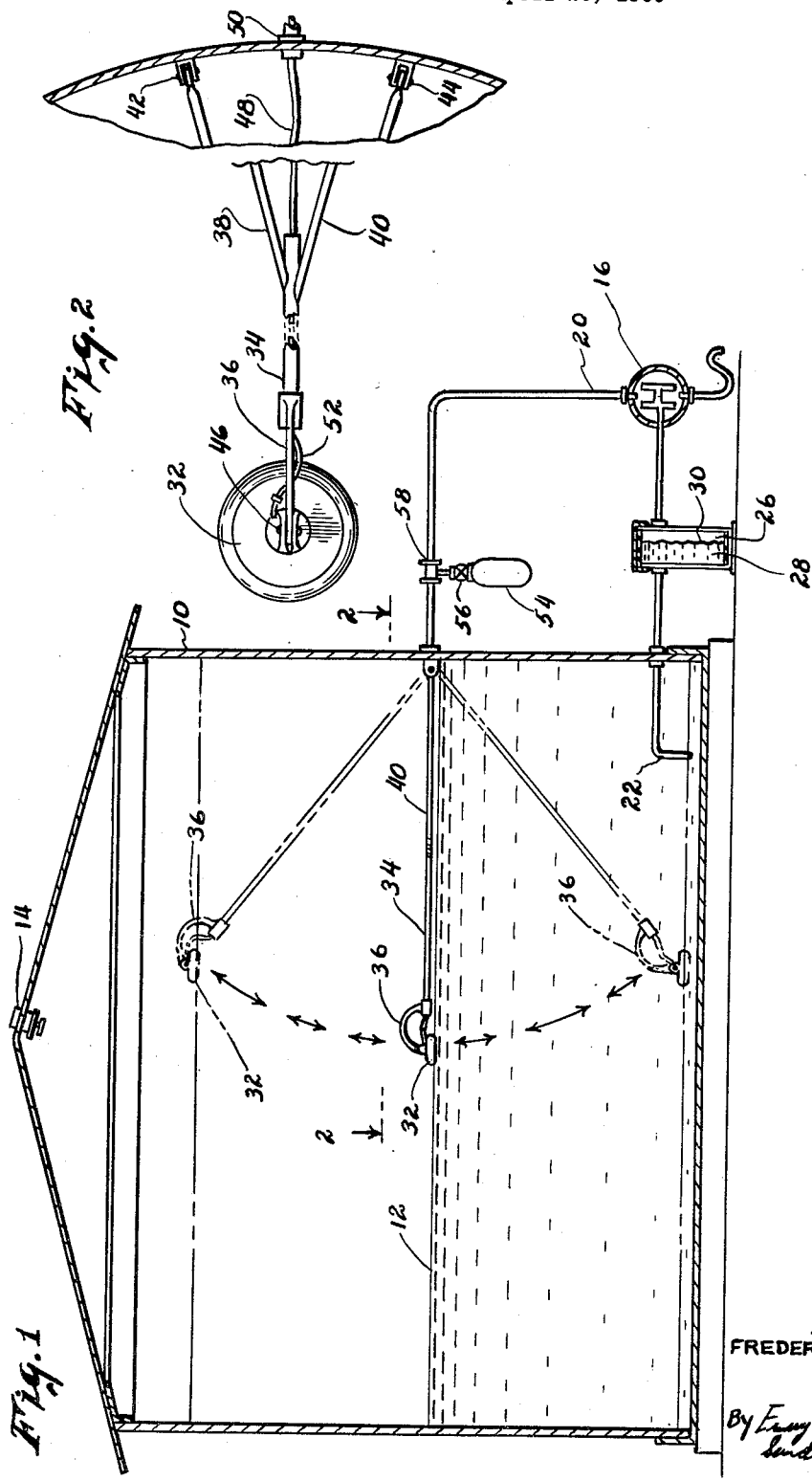
INVENTOR.
FREDERICK C. MELCHIOR
ATTORNEYS

United States Patent Office 3,048,037
Patented Aug. 7, 1962

3,048,037
TANK GAUGING DEVICE
Frederick C. Melchior, 258 Riverside Drive,
New York, N.Y.
Filed Apr. 25, 1960, Ser. No. 24,283
4 Claims. (Cl. 73—299)

This invention relates to the precise determination of liquid quantities by measurement of the differential hydrostatic pressure between the top and bottom of a liquid column.

Volumetric measurements of liquids stored in a container of known cross sectional area, in which the measurement must be referred to a reference or standard temperature, is conveniently made, in manner known to the art, by measurement of the hydrostatic pressure at the base of the stored liquid and calibrating the pressure gauge to the reference temperature in desired units of measure.

However, since the hydrostatic pressure measured at the base of the column includes the pressure imposed upon the top surface of the liquid column, it is necessary to factor out such imposed pressure.

In the major application of such measurement apparatus, namely pressurized closed storage tanks, the applied inert gas pressure has been cancelled from the hydrostatic pressure measured at the base of the liquid column. However, such cancellation is not satisfactory in obtaining the accuracies desired but unavailable to the art due to the variable weight of vapor column above the surface. For example, in storage of gasoline, precision of measurement of 1 part in 5000 is desired in the U.S., and 1 part in 20,000 is desired in free port of Europe.

It is therefore, the primary object of this invention to provide an improved means for the measurement of the hydrostatic pressure of the liquid column alone.

In accordance with this object there is provided in a preferred embodiment of this invention, a differential pressure instrument. The pressure at the base of the liquid column is applied to one side of the differential pressure instrument through an isolator which will transmit the pressure but prevent the liquid from entering the instrument. The other side of the differential pressure instrument is coupled to the top of the liquid column through a line carried by a float. Means are provided to purge the line extending to the top of the liquid column to prevent liquid from entering the instrument.

This invention may be more easily understood by reference to the following detailed description taken in conjunction with the accompanying drawings, of which:

FIG. 1 is a partially sectioned elevation view of the tank gauging device in accordance with this invention; and FIG. 2 is a partially broken-away view of a portion of the apparatus shown in FIG. 1.

In the figures there is shown a storage tank 10 within which is stored a liquid 12, such as gasoline. In order to inhibit evaporization of volatile liquids, the space above the liquid level may be pressurized to the pressure level determined by the setting of relief valve 14.

A differential pressure instrument 16 is provided to measure the difference between the pressures applied via lines 18 and 20. The differential pressure instruments may be those commercially known to the art. I have found it preferable to employ differential capsules of the concentrically corugated diaphragm type, disclosed in my U.S. Patent No. 2,760,260.

At the bottom of the liquid column there is provided an intake tube 22, the end of which is situated at a predetermined distance from the bottom of the tank. The distance from the bottom will be determined primarily by the amount of sedimentation expected in the tank and a safety factor to avoid clogging by such sediment. It will be noted of course that the distance from the bottom end of the tube and the bottom of the tank must be added to each measurement of the height of the liquid column in a manner known to the art. Since the distance is fixed, no error is introduced thereby.

In order to isolate the differential pressure measuring instrument 16 from the corrosive atmosphere contained within the tank, an isolator 24 is provided. The isolator comprises chambers 26 and 28 separated by a thin, non-springing, deflectable diaphragm 30 in order to accurately transmit pressures between chamber 28 and chamber 26 while isolating chamber 26 from the liquid in chamber 28.

In order to apply the pressure from the top of the liquid column to the differential pressure instrument via connection 20, there is provided a float 32 coupled to an arm 34 by means of a bridging connection 36. The arm 34 is hingedly connected to the side of the tank by braces 38 and 40 respectively coupled to the side of the tank by hinges 42 and 44. By this coupling the float is maintained approximately in the center of the tank since arm 34 is positioned along a radius of the tank. In order that the float will displace the same amount of liquid and thus maintain the same position at the surface, the float is hingedly connected to member 36 by hinge 46. A tube extends through the seal 50 in the side of the tank and terminates at the float. In this manner, the end of tube 48 is properly positioned to measure the pressure at a fixed distance from the level of the surface of the liquid contained within the tank. To prevent tube 48 from being entangled it has been found convenient to thread it through the hollow core of arm 34 and to affix it by a simple clamp 52 to the float carrying bridging connection 36. It will be noted, of course, that the tube 58 must be sufficiently rigid to maintain a hollow center and must be constructed of material impervious to the attack of the liquid contained within the tank.

In order to isolate the instrument 16 from contact with possibly corrosive fumes of the volatile liquids which may be measured by this system, there is provided a source 54 such as a pressure bottle, containing $CO_2$, nitrogen, or other inert gas, under pressure therein. A flow control valve 56 is provided to meter a small quantity of gas into the line 20 via the T connection 58. A trickle of gas flows into line 34 to purge the line of vapor, preventing vapor from reaching the instrument 16. The flow is restricted to a low rate to prevent establishment of a pressure differential which would introduce error into the pressure measurement.

In this manner there is provided an arrangement for measurement of the differential pressure of the liquid column. Since the output of the differential pressure instrument completely cancels out the effects of the pressure on top of the liquid surface, the output of the differential pressure instrument will reflect only the hydrostatic pressure of the liquid column alone. In this manner, accurate measurements of the height of the liquid column can be determined accurately by simple mathematical conversion.

This invention may be variously modified and embodied within the scope of the subjoined claims.

What is claimed is:

1. A gauging system for determining the hydrostatic pressure exerted by a fluid column alone when the fluid is contained in a tank in which the pressure on the surface of the fluid may vary, which comprises a first pressure pick-up mounted at the bottom of said fluid column, a second pressure pick-up floating on the surface of said fluid, and a differential pressure sensor coupled to said first and second pressure pick-ups, said differential pressure sensor adapted to measure the difference in pressure between said first and second pressure pick-ups.

2. A gauging system in accordance with claim 1 which includes an isolator positioned between said first pressure pick-up and said differential pressure sensor, said isolator adapted to transmit pressure changes, but to prevent flow of liquid therethrough.

3. A gauging system in accordance with claim 1 which includes a float to float on the fluid surface and in which said pressure pick-up comprises an open pressure transmittal tube one end of which is carried by said float and the other end of which is coupled to said differential pressure sensor, and means for continuously purging said tube by inert gas.

4. A gauging system in accordance with claim 3 which includes an arm, one end of said arm being hingedly coupled to said tank at the mean position of the fluid level, the other end of said arm being coupled to said float.

References Cited in the file of this patent
UNITED STATES PATENTS

| | | |
|---|---|---|
| 209,052 | Jerome | Oct. 15, 1878 |
| 723,040 | Schmitz | Mar. 17, 1903 |
| 2,651,939 | Weaver | Sept. 15, 1953 |

FOREIGN PATENTS

| | | |
|---|---|---|
| 357,836 | Germany | Sept. 1, 1922 |